US010590000B1

(12) United States Patent
Hurwitz

(10) Patent No.: US 10,590,000 B1
(45) Date of Patent: Mar. 17, 2020

(54) HIGH TEMPERATURE, FLEXIBLE AEROGEL COMPOSITE AND METHOD OF MAKING SAME

(71) Applicant: U.S.A. as represented by the Administrator of the National Aeronautics and Space Administration, Washington, DC (US)

(72) Inventor: Frances Hurwitz, Shaker Heights, OH (US)

(73) Assignee: United States of America as Represented by the Administrator of National Aeronautics and Space Administration, Washington, DC (US)

(*) Notice: Subject to any disclaimer, the term of this patent is extended or adjusted under 35 U.S.C. 154(b) by 27 days.

(21) Appl. No.: 14/456,043

(22) Filed: Aug. 11, 2014

Related U.S. Application Data

(60) Provisional application No. 61/866,585, filed on Aug. 16, 2013, provisional application No. 61/907,662, filed on Nov. 22, 2013.

(51) Int. Cl.
    *C01B 33/158*     (2006.01)
    *F16L 59/02*     (2006.01)
    *C08J 9/00*     (2006.01)
    *B32B 5/24*     (2006.01)

(52) U.S. Cl.
    CPC .......... *C01B 33/1585* (2013.01); *B32B 5/245* (2013.01); *C08J 9/0004* (2013.01); *F16L 59/028* (2013.01); *B32B 2250/02* (2013.01); *B32B 2266/04* (2013.01);

(Continued)

(58) Field of Classification Search
CPC . C01B 33/1585; C01B 33/157; C01B 33/149; C01B 33/14
See application file for complete search history.

(56) References Cited

U.S. PATENT DOCUMENTS 4,659,624 A * 4/1987 Yeager ................ B29C 70/086
    156/245
5,306,555 A * 4/1994 Ramamurthi ....... C01B 33/1585
    428/292.1

(Continued)

OTHER PUBLICATIONS

Horiuchi, et al., High Surface Area Alumina Aerogel at Elevated Temperatures, J. Chem. Soc. Faraday Trans., vol. 90, No. 17 (1994), pp. 2573-2578.*

(Continued)

*Primary Examiner* — Matthew J Daniels
(74) *Attorney, Agent, or Firm* — Robert H. Earp, III

(57) ABSTRACT

Aerogels, aerogel composites and methods of making the same are discussed. One example method can include the act of creating a boehmite colloid and adding a hydrolyzed silicon precursor to form a sol. A reinforcement can be infused with the sol and dried to form an aerogel composite. Such a method can also include the acts of performing one or more solvent exchanges and subjecting the gel composite to supercritical drying. Additionally, such a method can include the act of heat treating the aerogel composite. The aerogel composite can be used in high temperature, flexible seals capable of withstanding temperatures, pressures, and compression levels associated with aerodynamic heating generated during flight and in aerospace applications.

12 Claims, 13 Drawing Sheets

(52) U.S. Cl.
CPC ....... *B32B 2305/08* (2013.01); *B32B 2311/24* (2013.01); *B32B 2571/00* (2013.01)

(56) References Cited

U.S. PATENT DOCUMENTS

| | | | | |
|---|---|---|---|---|
| 5,312,791 | A * | 5/1994 | Coblenz | B01J 21/04 |
| | | | | 34/285 |
| 5,645,891 | A * | 7/1997 | Liu | B01D 67/0044 |
| | | | | 427/376.2 |
| 5,686,031 | A * | 11/1997 | Coronado | B01J 13/00 |
| | | | | 264/40.1 |
| 5,722,482 | A | 3/1998 | Buckley | |
| 5,786,059 | A * | 7/1998 | Frank | D04H 1/413 |
| | | | | 428/367 |
| 5,973,015 | A | 10/1999 | Coronado et al. | |
| 6,068,882 | A | 5/2000 | Ryu | |
| 6,087,407 | A | 7/2000 | Coronado et al. | |
| 6,224,846 | B1 * | 5/2001 | Hurlburt | C01F 7/026 |
| | | | | 423/625 |
| 6,479,416 | B1 | 11/2002 | Frank et al. | |
| 6,487,866 | B1 * | 12/2002 | Fesmire | G01N 25/18 |
| | | | | 374/44 |
| 6,492,014 | B1 * | 12/2002 | Rolison | B01J 13/0091 |
| | | | | 423/338 |
| 6,533,966 | B1 * | 3/2003 | Nonninger | C01G 19/00 |
| | | | | 252/520.1 |
| 6,555,090 | B1 * | 4/2003 | Chica Lara | B01J 29/049 |
| | | | | 208/113 |
| 7,504,346 | B2 | 3/2009 | Stepanian et al. | |
| 7,732,496 | B1 * | 6/2010 | Leventis | C04B 35/14 |
| | | | | 423/335 |
| 8,021,583 | B2 | 9/2011 | Rouanet et al. | |
| 8,039,099 | B1 | 10/2011 | Sullivan | |
| 8,214,980 | B2 | 7/2012 | Bullock et al. | |
| 2002/0052288 | A1 * | 5/2002 | Krell | C04B 38/00 |
| | | | | 501/105 |
| 2002/0094426 | A1 | 7/2002 | Stepanian et al. | |
| 2003/0003284 | A1 | 1/2003 | Schwertfeger et al. | |
| 2003/0077438 | A1 | 4/2003 | Frank et al. | |
| 2003/0215640 | A1 | 11/2003 | Ackerman et al. | |
| 2004/0033882 | A1 * | 2/2004 | Barney | C04B 14/064 |
| | | | | 501/95.1 |
| 2006/0240216 | A1 | 10/2006 | Stepanian et al. | |
| 2006/0280940 | A1 * | 12/2006 | Kanka | C04B 35/62236 |
| | | | | 428/364 |
| 2006/0293176 | A1 * | 12/2006 | Chang | B01J 29/005 |
| | | | | 502/214 |
| 2007/0082190 | A1 * | 4/2007 | Endres | C04B 20/1051 |
| | | | | 428/312.2 |
| 2007/0173157 | A1 | 7/2007 | Trifu et al. | |
| 2011/0266213 | A1 * | 11/2011 | Jo | B01D 67/0041 |
| | | | | 210/496 |
| 2011/0290365 | A1 | 12/2011 | Rosenberg | |
| 2012/0238174 | A1 | 9/2012 | Bullock et al. | |
| 2012/0308369 | A1 | 12/2012 | Maheshwari et al. | |
| 2013/0022769 | A1 | 1/2013 | Sabri et al. | |
| 2013/0071640 | A1 | 3/2013 | Szillat | |
| 2013/0324392 | A1 * | 12/2013 | Hasegawa | B01J 21/12 |
| | | | | 502/263 |

OTHER PUBLICATIONS

Boumaza, et al., Transition alumina phases induced by heat treatment of boehmite: An X-ray diffraction and infrared spectroscopy study, Journal of Solid State Chemistry, vol. 182 (2009), pp. 1171-1176.*

* cited by examiner

| Ceramic Reinforcement | Thickness (mm) | Density (g/cc) | Upper Use Temperature | Composition (%) |
|---|---|---|---|---|
| APA-2 Paper | 1.25 | 0.11 | 1650° C | 86 Al₂O₃, 10 SiO₂, 4 other oxides |
| Fiberfrax 972AH | 0.8 | 0.192 | 1176° C | 47-52 Al₂O₃, 48-53 SiO₂, <0.5 Na₂O, <0.5 Fe₂O₃ |
| Astroquartz (503 plain weave) Unsized | 0.11 | 2.2 | 1070° C | 99.99 SiO₂ |
| Saffil Paper | 0.5, 1.0 | 0.5-0.7 | 1600° C | 95-97 Al₂O₃, 3.0-5.0 SiO₂, <0.5 trace elements |

| Precursor powder | 2theta (deg) | d (020)(Å) | b (meas.) | b (PDF) | crystallite size | |
|---|---|---|---|---|---|---|
| P2 | 14.074 | 6.287 | 12.575 | 12.240 | 4.9+/-0.2nm | |
| P2W | 14.094 | 6.279 | 12.558 | 12.227 | 2.6+/-0.1nm | |
| T25 | 14.168 | 6.246 | 12.492 | 12.227 | 6.9+/- 0.1 nm | |
| L4 | 14.393 | 6.149 | 12.297 | 12.214 | 13.0 +/- 0.1nm | 48.1 +/- 0.9nm La(OH)$_3$ |
| XO | 14.400 | 6.146 | 12.292 | 12.232 | 11.7+/-0.1nm | |

FIG. 6

HIGH TEMPERATURE, FLEXIBLE AEROGEL COMPOSITE AND METHOD OF MAKING SAME

CROSS-REFERENCE TO RELATED APPLICATIONS

This application claims the benefit of U.S. Provisional Patent application Ser. No. 61/866,585 entitled High Temperature, Flexible Composite Seals for Aeronautics and Space Environments Incorporating Aerogel Insulation filed Aug. 16, 2013 and U.S. Provisional Patent application Ser. No. 61/907,662 entitled Method for Fabricating Aerogel Paper, Felt or Fabric Reinforced Composites filed Nov. 22, 2013. The entirety of the above-noted applications are incorporated by reference herein.

ORIGIN OF THE INVENTION

The invention described herein was made by employees of the United States Government and may be manufactured and used by or for the Government for Government purposes without the payment of any royalties thereon or therefor.

BACKGROUND

Aerogels are porous solids with high surface areas that are made by forming a gel network and removing the solvent without causing pore collapse. Due to characteristics such as high surface area, high porosity and low density, these lightweight aerogels are attractive for use as thermal insulators, low dielectric substrates and catalyst supports.

In general, a typical silica aerogel used as insulation loses its high surface area pore structure above about 700° C. As the pore structure of the silica aerogel sinters, thermal conductivity increases, diminishing the insulating capabilities of the aerogel and limiting its upper use temperature. Additionally, commercially available fibrous insulation incorporating silica aerogel exhibits poor adhesion of the aerogel to the fiber reinforcement, resulting in loss of aerogel particles in handling and contributing to a loss of insulating capability.

Traditional seals for high temperature applications, such as thermoelectric power generation and aerospace applications, incorporate a woven ceramic fabric wrapped around a non-woven, blanket type ceramic insulation. These non-woven thermal blanket type insulations are highly non-uniform in fiber density and spacing, and do not provide as low a thermal conductivity as has been demonstrated for high temperature aerogel composites. Conventional blanket insulation is compressible and the thermal characteristics of the blanket are altered by the degree of compression.

There is a need for insulation that can be used at temperatures between 600-1000° C. Although existing blanket insulations may be used at these temperatures, it is desirable to replace existing blanket insulation with higher efficiency, lighter weight materials.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a method of producing an aerogel composite. One example method can include the act of creating an alumina colloid and adding a hydrolyzed silicon precursor to the colloid to create a sol. One or more reinforcements can be infused with the sol to form a gel composite. Such a method can also include the acts of performing one or more solvent exchanges and subjecting the gel composite to supercritical drying to an aerogel composite. Additionally, such a method can include the act of heat treating the aerogel composite.

In another aspect, the subject innovation can include one or more aerogel composites. One such example aerogel composite can include a microporous solid phase product of a sol-gel including an alumina colloid and a hydrolyzed silicon precursor and a reinforcement.

In another aspect, the subject innovation can include a high temperature flexible seal including one or more layers of an aerogel composite. The aerogel composite layers can be wrapped in a jelly roll configuration having inner layers including an aerogel composite and an outer layer of an abrasion resistant fabric.

In yet another aspect, the disclosed aerogels, and aerogel composites, are based on alumina, aluminosilicates and/or titania systems and can maintain a high surface area pore structure to temperatures up to about 1200° C. In aspects, the aerogel can be incorporated into reinforcing substrates, such as ceramic papers, felts or fabrics, with good bonding between the aerogel and the fibers, such that flaking or spalling of the aerogel particles is minimized or prevented.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 6 is a table summarizing the properties of boehmite precursors studied in connection with experiments discussed herein.

DETAILED DESCRIPTION

Figure 1:
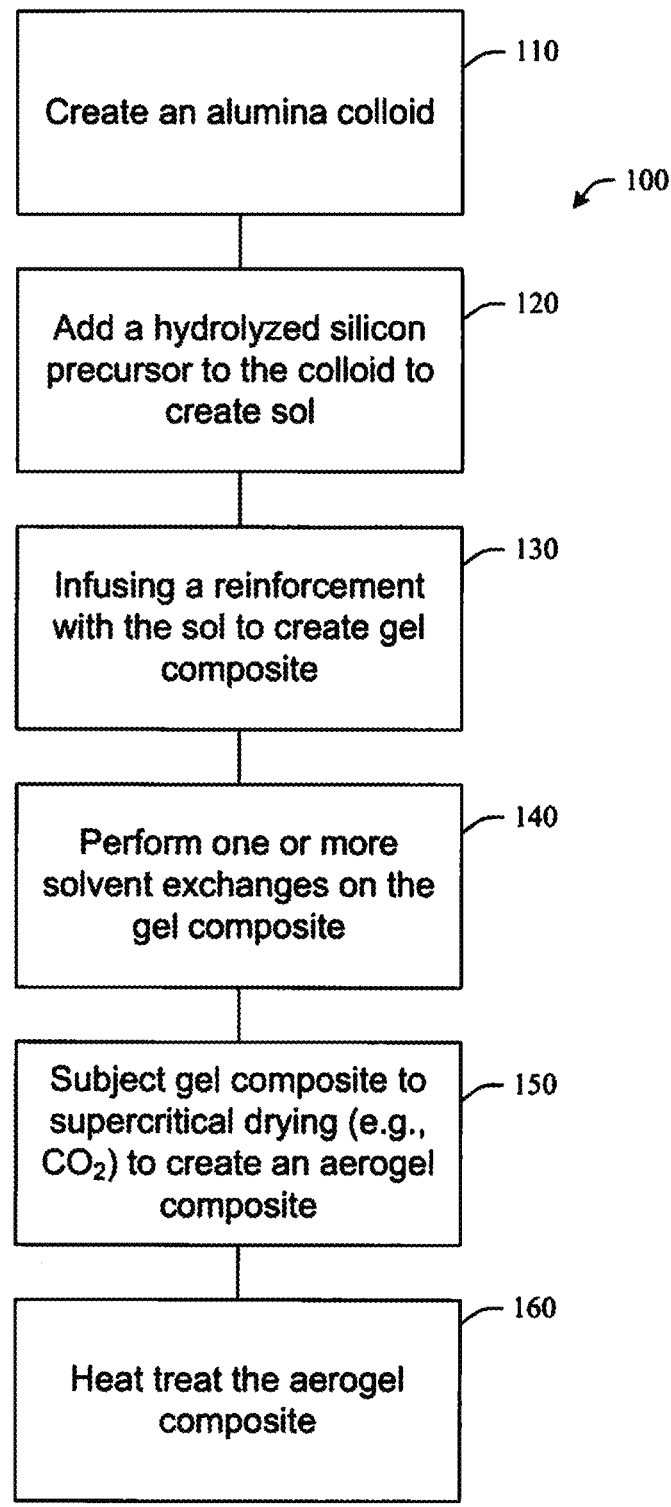
FIG. 1 illustrates a method of fabricating an aerogel composite in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

In various aspects, the subject innovation can include aerogels, and aerogel composites, based on alumina, aluminosilicates and/or titania systems that maintain a high surface area pore structure up to temperatures of about 1200° C. The aerogels can be incorporated into a reinforcing substrate, for example, ceramic papers, felts or fabrics. Bonding between the aerogel and the reinforcements can prevent or minimize flaking or spalling of the aerogel particles.

The subject innovation can include an aerogel composite and methods of making the same via depositing an aerogel within a reinforcement that includes, for example, silicon carbide, alumina, silica, mullite and combinations thereof.

The subject innovation can include a high temperature, flexible seal comprising an aerogel composite capable of withstanding temperatures, pressures, compression levels, and exposure durations due to intense aerodynamic heating generated during flight and in aerospace applications.

In an embodiment, a high temperature, flexible seal suitable for aerospace applications includes layers of aerogel infused reinforcements wrapped in a jelly roll fashion. The jelly roll structure can include an outer covering including an abrasion resistant fabric such that the aerogel is protected from abrasion in application. The jelly roll can be secured by most any technique sufficient to hold the structure together, for example, the jelly roll may be stitched or quilted.

In application, the jelly roll structure forms a seal that can be placed in a channel between mating surfaces to protect from intrusion of atmospheres or heat flow. The use of aerogel composite layers in the seal decreases the thermal conductivity of the seal relative to traditional seals using non-woven ceramic blanket materials.

The high temperature, flexible aerogel composite in accordance with various embodiments of the subject innovation can have application as seals or insulation, for example, in space environments or aeronautics. The high temperature, flexible aerogel seals can withstand the rigors of space and interplanetary missions, including exposure to atomic oxygen, ultraviolet radiation, thermal cycling, and abrasion.

Conventional non-woven thermal blanket type insulations are non-uniform in fiber density and spacing, and do not provide as low a thermal conductivity as has been demonstrated for high temperature aerogel composites. Commercial insulating materials which incorporate aerogels typically use silica as the aerogel material, however, the pore structure of silica aerogels begins to collapse and sinter at temperatures above 700° C., limiting the upper use temperature of blanket type insulations.

The subject innovation includes aerogels, aerogel composites and aerogel insulations based on, for example, alumina, aluminosilicates and/or titania systems that can maintain a high surface area pore structure to temperatures up to 1200° C. The aerogels can be incorporated into reinforcing ceramic papers, felts or fabrics, with good bonding between the aerogel and the fibers, such that the aerogel particles are not abraded in use.

A reinforcement, for example, a ceramic fabric, felt or paper material, can be impregnated with a sol and then dried to form an aerogel. The reinforcement can include high temperature ceramic fibers. The aerogel precursor sol can act to bond the particles to the fiber as an inherent part of the gelation process. The fiber reinforcement, or substrate, then undergoes the aerogel drying process as part of the composite.

In an embodiment, an aerogel composite according to the present disclosure can be laid on top of a ceramic fabric such as silicon carbide, alumina, or a combination of silica, alumina or mullite and wrapped in a jelly roll fashion such that the aerogel is protected from abrasion by the fabric in application. A woven ceramic fabric is capable of withstanding rubbing between adjacent parts or surfaces and can protect a more fragile aerogel composite.

The jelly roll can be secured, for example, by quilting or stitching or needling with high temperature thread. The seal can be placed in a channel between mating surfaces to protect from intrusion of atmospheres or heat flow. The use of aerogel layers in a seal can decrease the thermal conductivity of the seal relative to state-of the art seals using non-woven ceramic blanket materials.

In other embodiments, the disclosed aerogel composite can serve as one or more layers in a seal comprised of an outer, abrasion resistant woven fabric, a series of insulating layers stacked with the highest temperature capable insulators toward the hottest side of the seal, and graded to lower temperature capable insulating materials. Insulators may include ceramic fabrics, battings, felts or papers or monolithic aerogels or polymers, for example, on the cooler side of the seal.

In further embodiments, the disclosed aerogel composite can serve as a separator between metallic sheets or foils as part of a multilayer insulation. The multilayer insulation may include the use of radiation opacifiers incorporated within the aerogel and/or as separate layers.

Typical non-woven thermal blanket type insulations are non-uniform in fiber density and spacing, and do not provide as low a thermal conductivity as has been demonstrated for high temperature aerogel composites. Commercial insulating materials which incorporate aerogels generally use silica as the aerogel material, however, the pore structure of silica aerogels begins to collapse and sinter at temperatures above 700° C., making them unsuitable for higher temperature applications.

In an embodiment, a flexible, compressible seal incorporates an aerogel composite that provides improved thermal insulation as compared with existing seals for aeronautic and space applications. In an embodiment, the disclosed seal improves the thermal insulating capability of state of the art seal designs utilizing non-woven ceramic insulation.

The subject innovation includes a method for fabricating low density, flexible aerogel composites for use as thermal insulation for a fiber/aerogel system in which the aerogel is well-bonded to reinforcing fibers of a substrate. The bonding of the aerogel to the fibers of a reinforcement greatly reduces flaking and loss of aerogel particles compared with commercially available aerogel insulations. The disclosed aerogel composite insulation can provide very low thermal conductivity, for example, less than 60 mW/m·K at 900° C. in argon, based upon a three point measurement via the three point method of Gembarovic and Taylor, *Int. J. Thermophys.* (2007) 28:2164-2175, the entirety of which is incorporated herein by reference. The disclosed aerogel composite insulation exhibits very low density, typically 0.15 gm/cm$^3$, and can be used at temperatures of greater than 1100° C. The density of the disclosed aerogel composite can be ⅓ that of start-of-the-art insulation materials for space applications.

Commercially available fibrous insulation using silica aerogel exhibit poor adhesion of the aerogel to the fiber reinforcement, resulting in loss of aerogel particles in handling. These materials show large variation in properties, including variation in insulation thickness, and many are rated for use only to temperatures below 400° C., and, in other cases, below 650° C.

Referring initially to the drawings, FIG. 1 illustrates a method 100 of fabricating an aerogel composite in accordance with aspects of the subject innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 100 can begin at 110, by creating a colloid of alumina. For example, a boehmite powder can be suspended in a water or acid solution. The boehmite solution can be sonicated to break up any aggregates.

At 120, a hydrolyzed silicon precursor is added to the boehmite colloid to create a sol. In an embodiment, a silicon precursor can include tetraethyl orthosilicate (TEOS) hydrolyzed in an alcohol solution using a nitric acid catalyst. The hydrolyzed TEOS can be combined with the colloidal boehmite suspension and magnetically stirred.

In further embodiments, the addition of an opacifier at step 120 can reduce heat transfer due to radiation when the aerogel composite is used as an insulator. For example, a colloidal suspension of TiO2 or ZrO2 can be added to the hydrolyzed TEOS solution at step 120. It was found that higher levels of TiO2 incorporation can be attained by incorporating colloidal TiO2 rather than a liquid Ti precursor such as titanium isopropoxide as a reactant in the sol-gel synthesis. Use of TiO2 isopropoxide has been found to increase viscosity and decrease gel time, and can be limited to <10 mole percent in the boehmite derived aluminosilicate system. The use of colloidal TiO$_2$ also averts the impurities found in commercial titania powders typically used as opacifiers. Such impurities can lead to grain growth accompanied by densification of the aerogel at 1100° C., whereas aerogels containing colloidal titania maintain their porous structure to beyond 1200° C.

At 130, a layer of reinforcement can be infused with the sol. The reinforcement can include a ceramic paper, felt or fabric. The reinforcement can include silicon carbide, alumina, silica, mullite, zirconia and combinations thereof.

In an embodiment, reinforcements including fabrics, paper or felts without sizing or organic binders are utilized. If a sized fabric is utilized, the sizing can be removed by heat cleaning prior to step 130.

The reinforcement layers can be sufficiently thin so as to yield a flexible composite. A layer of reinforcement can be infused, soaked or impregnated with the sol to create a gel composite.

In aspects, a first layer of reinforcement can be placed in a container and/or on a rigid sheet and a sufficient volume of sol applied so that the reinforcement is submerged. A separator sheet (e.g. a piece of silkscreen) can be placed on top of the sol infused reinforcement. Subsequent layers of reinforcement can be added in the same manner, with additional sol added to cover each layer.

After adding a last layer, a slight compressive force may be applied to the layers to maintain flatness of the reinforcement layers and to prevent the buildup up of excess gel on the reinforcement surface. The sol can be allowed to gel for a period of time, for example 24 hours, at ambient temperature or in a heated oven.

After gel formation, one or more solvent exchanges can be performed at step 140. For example, the gel composite layers can be transferred to a container containing 200 proof ethanol and the separator sheets removed. In an embodiment, the gel composite layers can be aged in a solvent, for example, methanol, ethanol, acetone, or acetonitrile. In aspects, after aging in ethanol from 2 days to several weeks, the layers can be separated and transferred to a supercritical CO$_2$ dryer to exchange the ethanol with liquid CO$_2$.

After removal of the solvent, the gel can be subjected to supercritical drying (e.g., supercritical CO$_2$ extraction, etc.) at 150 to remove the liquid phase and create an aerogel composite. Several soak and vent cycles can be performed, typically 5, to exchange the CO$_2$. A pressure vessel can be heated and the CO$_2$ vented under supercritical conditions.

At step 160, the aerogel composite can be heat treated in air, for example, at 600° C. for 20 minutes to convert the boehmite phase to Al$_2$O$_3$ to further reduce the thermal conductivity of the aerogel composite.

In alternate embodiments, the ratios of Al:Si can be varied, or the Si can be omitted to form an all alumina aerogel.

Figure 2:
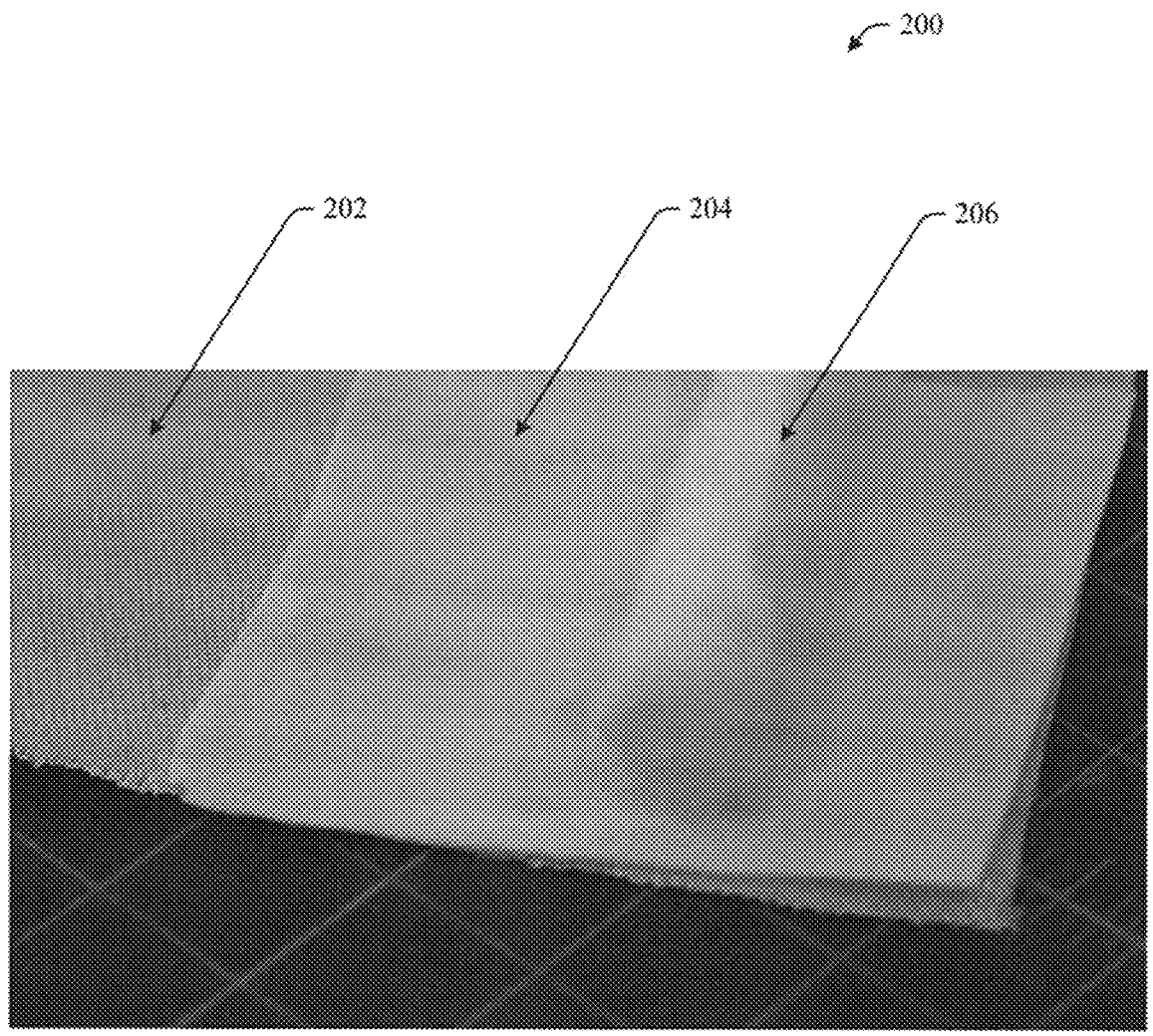
FIG. 2 illustrates a high temperature, flexible seal in accordance with aspects of the subject innovation.

FIG. 2 illustrates layers of an example of a high temperature flexible seal 200 suitable for aeropace applications including an abrasion resistant fabric 202, for example, a woven ceramic fabric, a layer of aerogel infused reinforcement 204 and a blanket or rope insulation 206.

Figure 3:
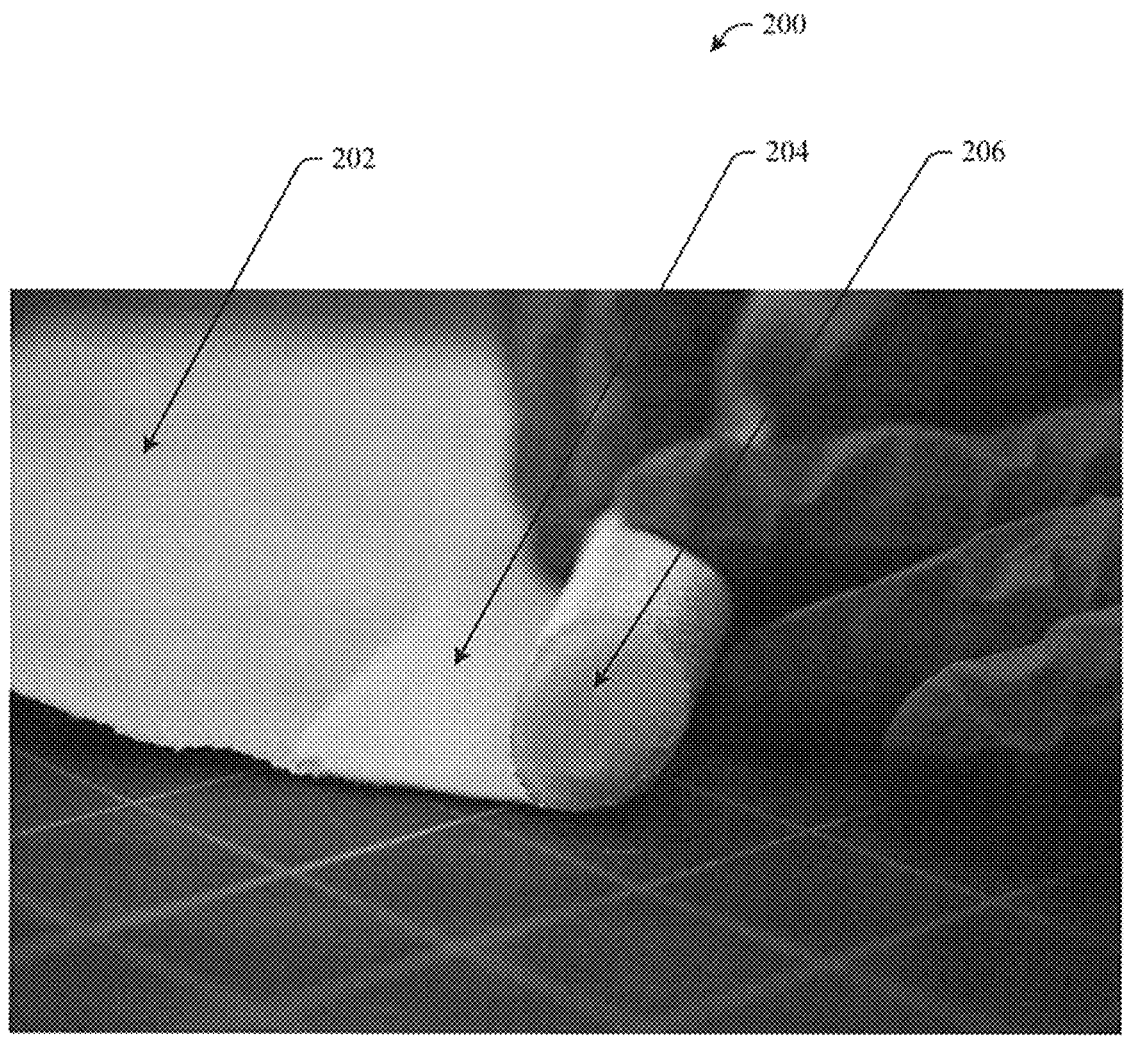
FIG. 3 illustrates a high temperature, flexible seal in accordance with aspects of the subject innovation.

FIG. 3 illustrates layers of an example high temperature flexible seal 200 wrapped in a jelly roll fashion. A layer of abrasion resistant fabric 202 is laid down, then a layer of aerogel infused reinforcement 204 is laid down and a blanket or rope insulation 206 is layered on top. The layers 202, 204, 206 can be rolled up such that the abrasion resistant fabric 202 forms an outer covering that protects the aerogel infused reinforcement 204 from abrasion in application. The jelly roll can be secured by most any technique sufficient to hold the layered and rolled structure together, for example, the jelly roll may be stitched or quilted. In various embodiments, a high temperature flexible seal can include one or more layers of an aerogel composite 204.

In aspects, the aerogel composite layers 204 can be wrapped in a jelly roll configuration around a blanket or rope insulation 206. The inner layers of the jelly roll can include an aerogel composite 204 and an outer layer 202 can include an abrasion resistant 2D fabric or 3D braid.

Figure 4:
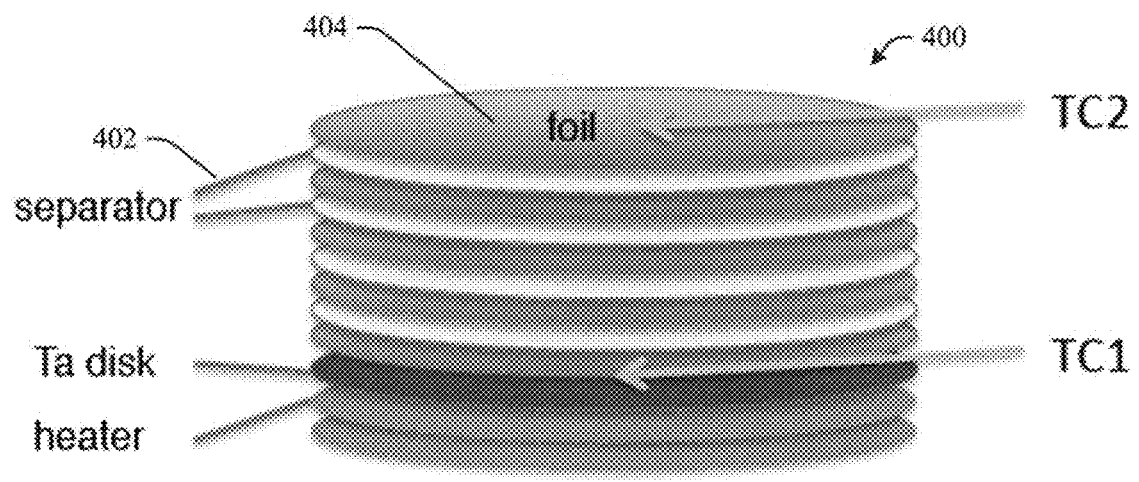
FIG. 4 illustrates a multilayer insulation and a graph of top foil temperature versus Ta disk temperature for an example multilayer insulation in accordance with aspects of the subject innovation, comparing alumina paper separators without aerogel with alumina paper/aerogel composite separators.
Figure 4:
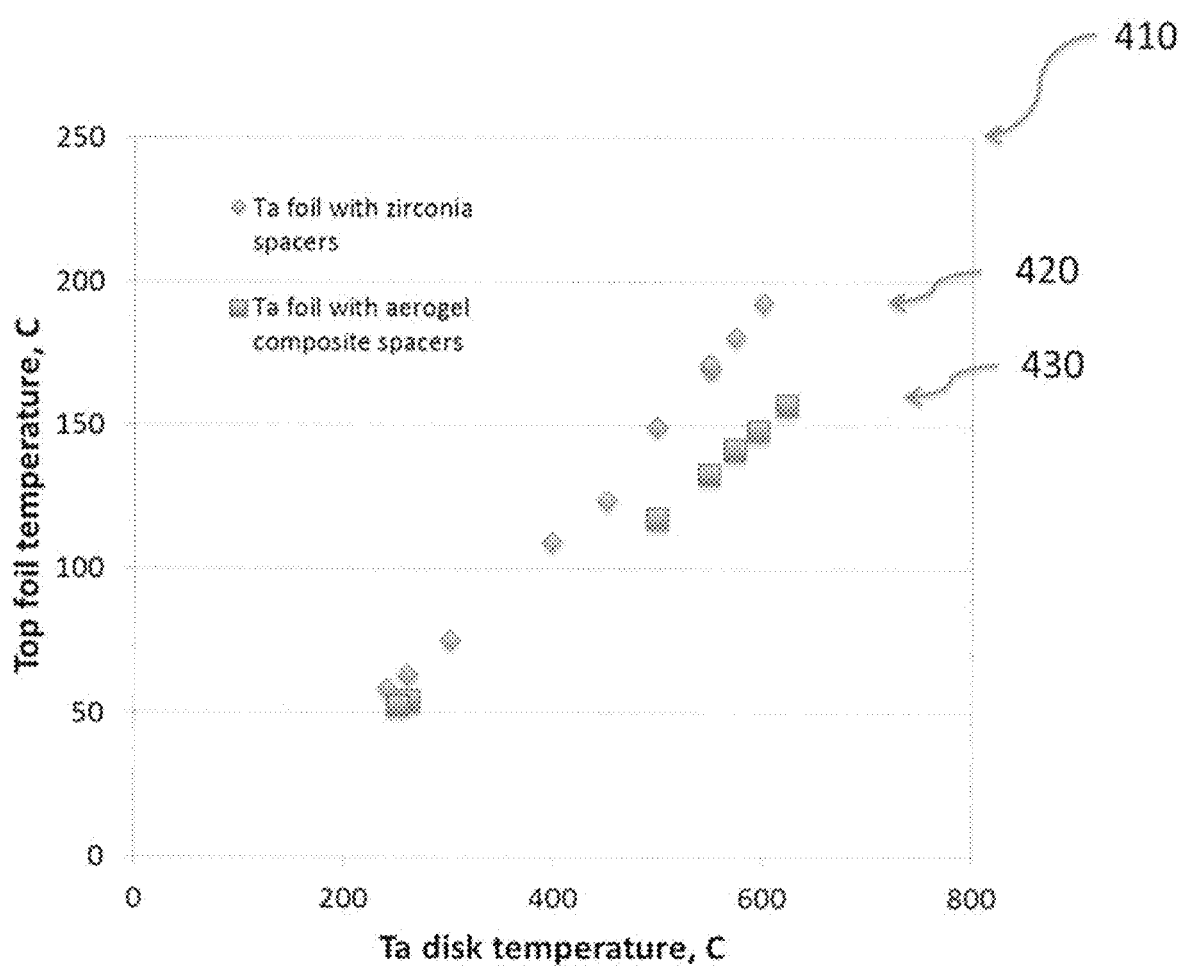

FIG. 4 illustrates an example multilayer insulation (MLI) 400 including the disclosed aerogel composite. The disclosed aerogel composite can serve as a separator 402 between metallic sheets or foils 404 as part of a multi-layer insulation 400. A comparison of a multilayer insulation having ceramic paper APA-2/aerogel composite 430 separators with a multilayer insulation having APA-2 ceramic paper 420 alone under stepped heating tests is shown in table 410. Test results revealed that aluminosilicate aerogel reduces heat transfer. For example, the temperature of the $5^{th}$ TA foil is nominally 40° C. less at a disk temperature of 600° C. when the APA-2 paper is impregnated with the aerogel 430.

Still referring to FIG. 4, the impregnation of APA alumina paper with aerogel reduced thermal conductivity in argon at 900° C. from 100 mW/m·K to 59 mW/m·K. Seven layers of composite material of 1.25 mm/layer produced a temperature drop of 700° C. when tested in the 8'HTT wind tunnel, 17 W/cm2 flux; 1435 psi @3300•R combustor pressure. The porous aerogel structure survived the wind tunnel test. When tested as a foil separator in multilayer insulation (MLI) 400, the disclosed aerogel composite outperformed a baseline zirconia spacer. The multilayer insulation (MLI) 400 may include the use of radiation opacifiers, either incorporated within the aerogel or as separate layers.

Figure 5:
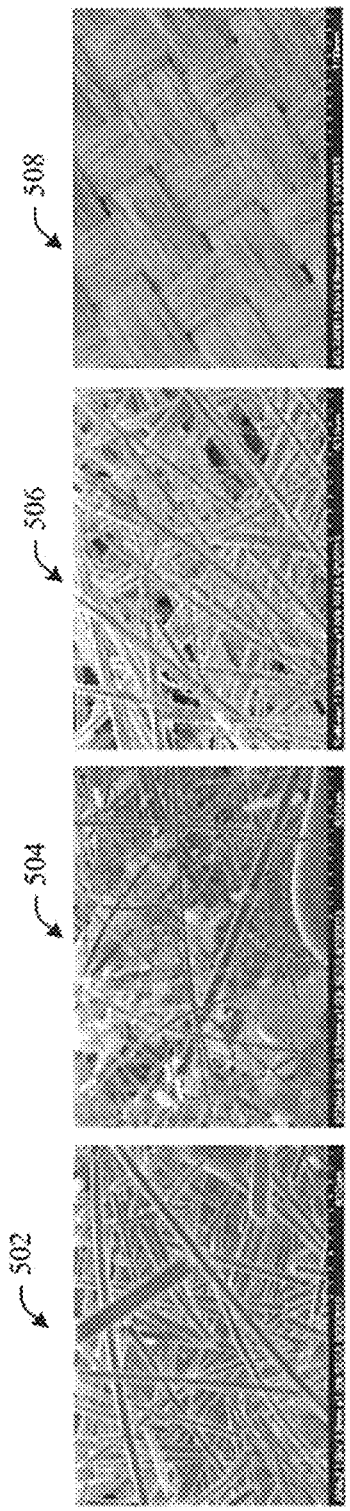
FIG. 5 illustrates various reinforcements, and a table summarizing their properties, in accordance with aspects of the subject innovation

FIG. 5 illustrates various reinforcements, and a table summarizing their properties, in accordance with aspects of the subject innovation. Reinforcements can include fabric, felt or paper, for example, APA-2 ceramic fabric 502, Fiberfrax® 972AH 504, Astroquartz® (503 plain weave) unsized 506, and Saffil® paper 508.

What follows is a more detailed discussion of certain compositions, articles, methods, materials, and apparatuses associated with aspects of the subject innovation. To aid in the understanding of aspects of the subject innovation, theoretical analysis and experimental results associated with specific experiments that were conducted are discussed herein.

However, although for the purposes of obtaining the results discussed herein, specific choices were made as to the selection of various aspects of the experiments and associated setups, such as choice of materials (e.g., selection of alumina, silica, solvent(s), relative concentration, etc.), the compositions, articles, and methods described herein can be employed in other contexts, as well. For example, various aspects of the subject innovation can be utilized to produce aerogels for a variety of uses. In some embodiments, different selections of materials or formulation parameters can be selected than those used in the experiments discussed herein, and may have differing characteristics, as explained in greater detail below.

Of the materials used in experiments discussed herein, the boehmite powders were donated by Sasol North America. TEOS was purchased from Sigma-Aldrich (St. Louis, Mo.). Reagent grade nitric acid was purchased from Fisher Scientific.

Super-critically dried aerogels were characterized by physical measurement to determine shrinkage and physical density. Pore size distribution as well as nitrogen adsorption/desorption were used to determine surface area. Chemical bonding structure of starting powders and aerogels were characterized by Fourier transform infrared spectroscopy (FTIR) using KBr pellets.

Solid state Al Direct Polarization (DP) and $^1H$-$^{29}Si$ Cross-Polarization (CP) NMR spectra were acquired using a nuclear magnetic resonance spectrometer. Field emission scanning electron microscopy (FESEM) was performed on uncoated samples using low accelerating voltage (typically 1 kV) to characterize pore morphology.

Thermal analysis of the aerogels was conducted using simultaneous thermogravimetric analysis (TGA) and differential thermal analysis (DTA) in helium to identify mass loss and phase transitions. X-ray diffraction analysis (XRD), obtained from Cu Kα radiation, was used to characterize both starting boehmite powders and aerogels, and to correlate phases in heat-treated samples with DTA transitions. Multiple regression techniques were employed for data analysis using statistical software.

Alumina and aluminosilicates aerogels offer potential for use at temperatures above 700° C., where silica aerogels begin to sinter. Stability of alumina and aluminosilicates pore structures at high temperatures can be governed by the starting aerogel structure, which, in turn can be controlled by the synthesis route.

Experiments were conducted and the structure, morphology and crystallization behavior was compared for aerogels synthesized from $AlCl_3$ and propylene oxide with those synthesized from a variety of boehmite precursors.

The aerogels possessing a crystalline boehmite structure in the as-synthesized condition retained mesoporous structures to temperatures of 1200° C., while the $AlCl_3$-derived aerogels, although exhibiting higher as-synthesized surface areas, crystallized and densified at 980-1005° C.

Alumina and aluminosilicates aerogels are of interest as constituents of thermal insulation systems with potential for use at temperatures higher than those attainable with silica aerogels, which densify and sinter at temperatures above 600-700° C. Addition of alumina, in combination with silica, has been shown to delay sintering to higher temperatures, with increases in sintering temperature achieved using as little as 0.01 mole % $Al_2O_3$ (from boehmite) added to silica on a nanoscale.

The nanostructure of the aerogel varies based on the synthesis route, including choice of precursors, solvent, water/precursor ratio, dilution, pH and use of templating agents. In aluminosilicates aerogels, the extent of aluminum incorporation is also shown to vary with the precursor route. The experiments focus on synthesizing alumina and aluminosilicates aerogels using two precursor routes: (1) $AlCl_3$ and propylene oxide (PO) or (2) a colloidal route using several boehmite starting powders. In both routes, tetraethoxysilane (TEOS) was used as the silicon source.

The experiments based on synthesizing aerogels using $AlCl_3$ and propylene oxide (PO) focused on two Al/Si mole ratios: 8Al:1Si, anticipated to produce an aluminum-rich composition, or 3Al:1Si, close to stoichiometric mullite. Two levels of solids loading were investigated: Al+Si equal to 48 mmol (designated as low solids) or 72 mmol (high solids).

$AlCl_3$ was dissolved in a solution of alcohol (absolute ethanol) and water at either a "high water" (17.4 ml water in 38 ml alcohol) or "low water" (6.4 ml water in 38 ml alcohol) level. The solution was heated for 30 minutes to dissolve all the $AlCl_3$ powder, and then cooled to room temperature. TEOS was added, and the solution stirred for 60 minutes. The solution was chilled in a bath of ice water prior to the addition of propylene oxide to extend gelation times.

Propylene oxide was transferred by syringe through a septum, so as to reduce laboratory personnel exposure. Propylene oxide is listed by the U.S. Environmental Protection Agency as a group B2 possible human carcinogen (EPA Bulletin 75-96-9, April 1992, revised January 2000.) After slow addition of propylene oxide, the solution was stirred very briefly (1-2 minutes) to mix, then poured into molds and covered with parafilm. Gelation typically occurred in 10-30 minutes.

The gels were aged at ambient temperature for 24 hours before being extracted into absolute ethanol. The gels were washed by exchange of ethanol after an additional 24 hours, and aged in ethanol for 3-31 days before being super-critically dried using carbon dioxide.

In another series of experiments, boehmite derived aerogels were synthesized utilizing several boehmite [AlOOH] powders designated as P2, P2W, L4 and T25. In a preliminary study, use of soluble precursors has been shown to favor gel networks with significant Al—O—Si tetrahedral bonding, while the colloidal approach primarily maintains the $AlO_6$ octahedral structure characteristic of boehmite.

FIG. 6 is a table summarizing the properties of the different boehmite precursors studied in connection with experiments discussed herein.

Figure 7:
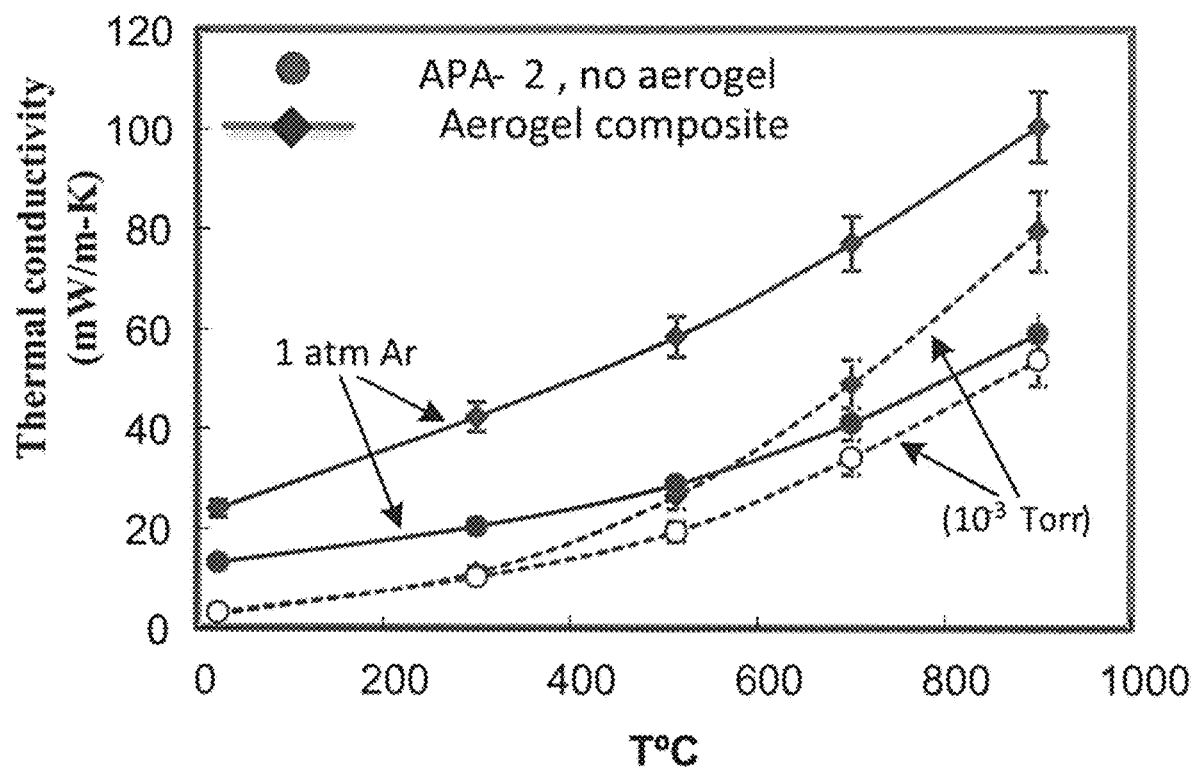
FIG. 7 illustrates a graph of thermal conductivity versus temperature in connection with an alumina paper having no aerogel composite and an aerogel composite in accordance with aspects of the subject innovation.

FIG. 7 illustrates a graph of thermal conductivity versus temperature in connection with an APA-2 alumina paper made principally of alumina fiber having no aerogel composite and an aerogel composite in accordance with aspects of the subject innovation.

Aluminosilicate aerogels were prepared at Al:Si ratios of 8Al:1Si and 3Al:1Si. The boehmite powders were dispersed in 0.09M nitric acid solution or in water, and sonicated using an ultrasonic processor for 2 minutes at 60 percent amplitude for batch sizes of 15 ml. TEOS was hydrolyzed with a stoichiometric amount of water using a nitric acid catalyst in 200 proof ethanol, and the mixture was vigorously stirred. TEOS was hydrolyzed separately for 60 minutes in 38 ml of an absolute ethanol solution containing 4 mmol water/mmol TEOS, and 0.625 ml of a 0.13M nitric acid solution.

The TEOS solution was added slowly to the boehmite dispersion, and stirred for an additional 15 minutes. The combined sol was poured into polyethylene molds and held at either ambient temperature or 55° C. for 24 hours, following which the hydrogels were extracted into 200 proof ethanol, and then super-critically dried using carbon dioxide.

The aerogels were placed into high purity alumina boats and heated in a tube furnace under an atmosphere of flowing argon. Temperatures were ramped at a rate of 5° C./min to final temperatures of 600, 1000, 1100, 1200 or 1300° C., and held at the temperature for 18 minutes. The furnace was then allowed to cool to room temperature under continued argon flow.

Boehmite derived aerogels exhibited lower physical density (0.050-0.075 gm/cm$^3$) than those synthesized using $AlCl_3$/TEOS/PO. Shrinkages also were much lower, ranging from slight swelling to 5.3% linear shrinkage. Unlike the $AlCl_3$/TEOS/PO gels, shrinkage was not increased by aging prior to super-critical drying. The boehmite derived aerogels also were more fragile on handling. Surface areas were considerably lower than those of the $AlCl_3$/TEOS/PO aerogels, and ranged from 150-465 m$^2$/g.

Figure 8:
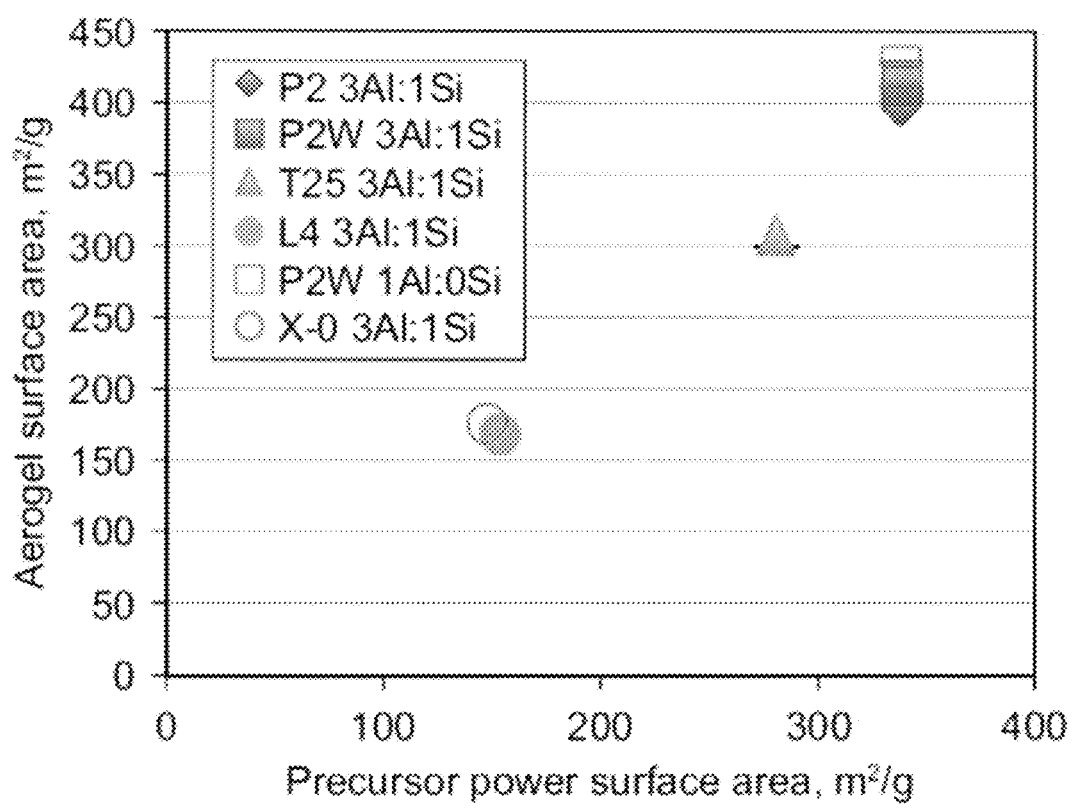
FIG. 8 illustrates a graph of aerogel surface area versus precursor powder surface area studied in connection with experiments discussed herein.

In FIG. 8, the surface areas of the starting powders and those of corresponding aerogels are plotted. Aerogel surface area and morphology differed with that of the starting precursor boehmite powder. The crystallographic properties of the starting powders are shown in FIG. 6. Smaller crystallite size and higher surface area powders gave rise to higher surface area aerogels. Surface areas >400 m$^2$/g were attained using the smallest crystallite size P2 and P2W powders, with no significant difference between the two.

Figure 9:
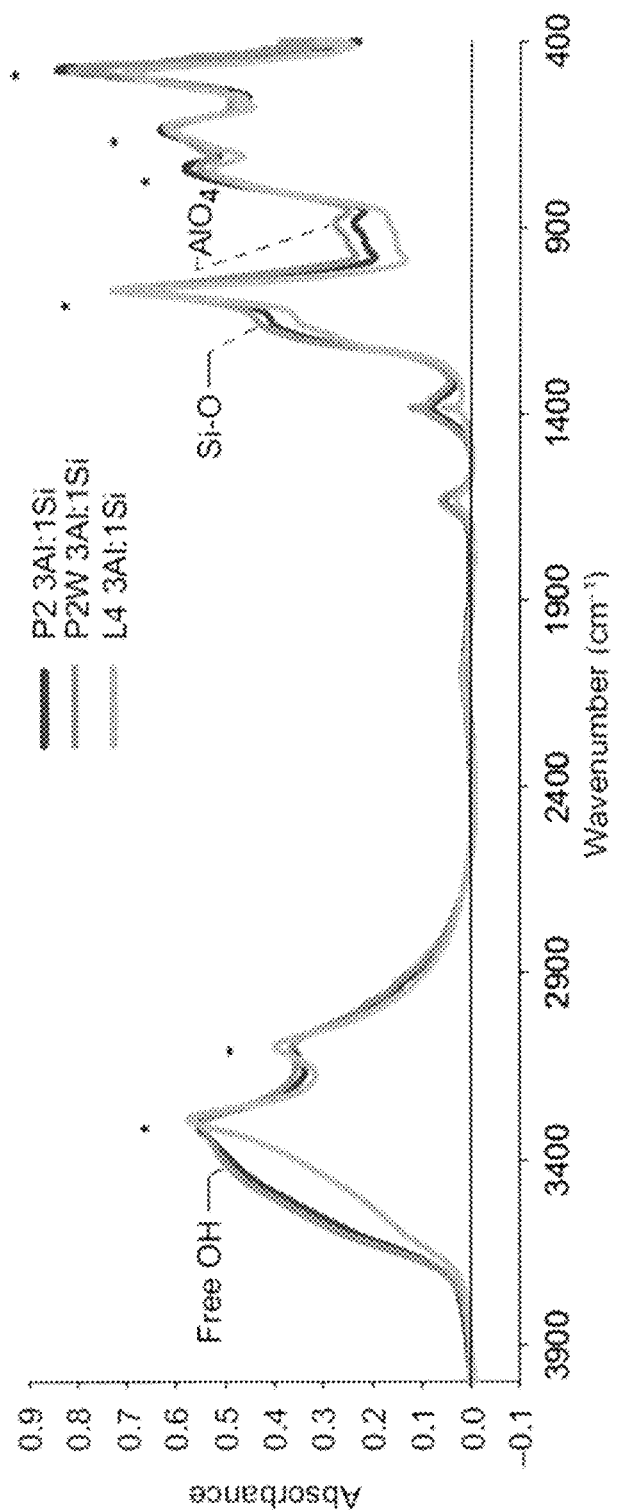
FIG. 9 illustrates FTIR spectra of boehmite derived aerogels studied in connection with experiments discussed herein.

FIG. 9 shows Fourier transform infrared spectra of the boehmite derived aerogels from three different starting boehmite powders. FIG. 9 demonstrates that the aerogel structure reflects that of boehmite ($\gamma$-AlOOH), retaining the peaks that are characteristic of the starting powders at 3284 and 3089 (Al—OH), 1068, 736, 630 and 474 cm$^{-1}$. The asterisks denote peaks that are characteristic of the starting powders.

In the boehmite-derived aluminosilicates, aerogels additional peaks are observed at 1126 (SiP$_4$) and 1010 cm$^{-1}$ (likely arising from AlO$_4$ or Si—O—Al). The spectra would support a gel backbone structure based on an assembly of boehmite crystallites.

Figure 10:
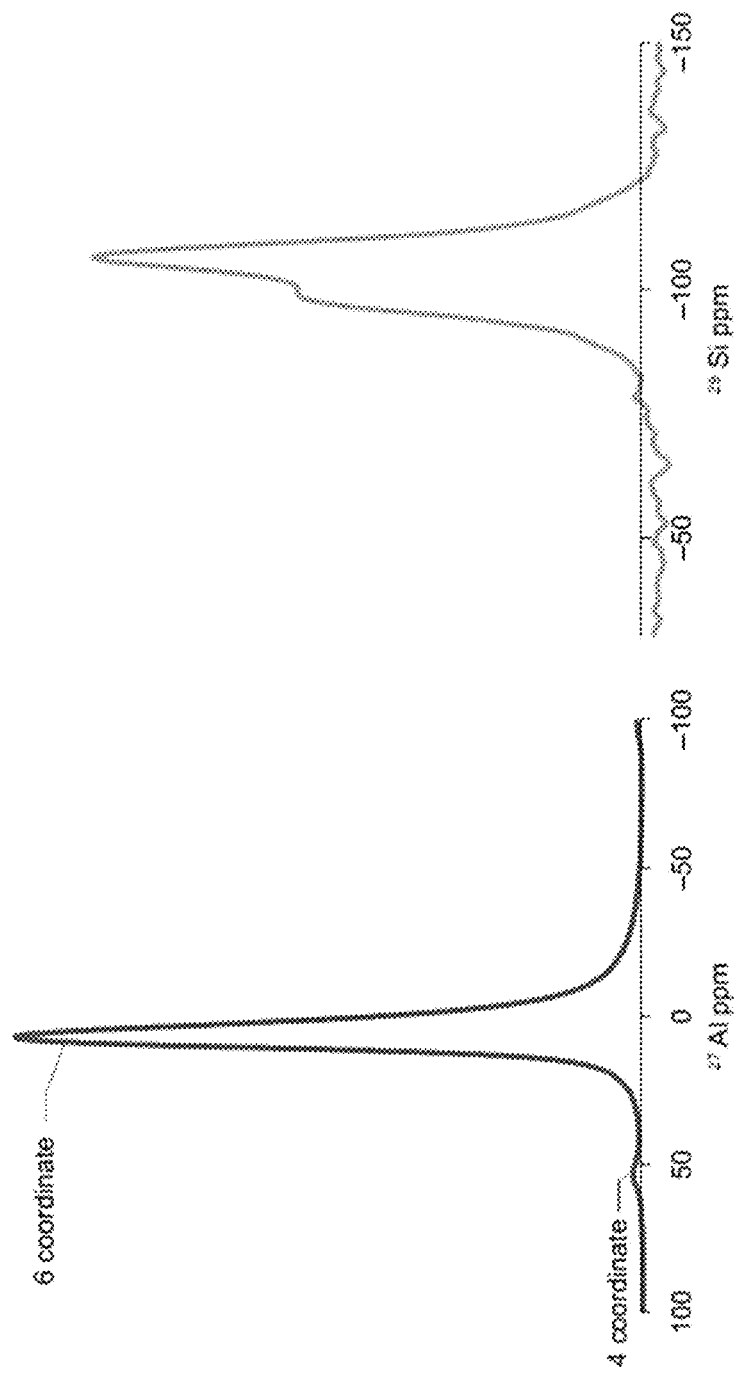
FIG. 10 illustrates solid state NMR spectra of a boehmite derived aerogel of the subject innovation.

The $^{27}$Al and $^{29}$Si NMR spectra of 3Al:1Si boehmite aerogels illustrated in FIG. 10 provide further support for the self-assembly of boehmite crystallites. The $^{27}$Al spectrum demonstrates a dominant 6 coordinate alumina peak at 7 ppm, with only a very small 4 coordinate alumina peak at 57 ppm. The ratio of AlO$_4$ to AlO$_6$ is considerably less than that in the $AlCl_3$/TEOS/PO gels. The $^{29}$Si NMR spectrum is characterized by a peak at −106 ppm with a shoulder at −98 ppm, showing a very different Si environment than that of the $AlCl_3$/PO gels and consistent with an interpretation of a diphasic gel.

The peak at −106 ppm is consistent with Si(O—Si)$_4$ tetrahedra, while the peak at −98 ppm is consistent with the presence of Si—O—Al bonds in an Si(O—Al)(O—Si)$_3$ configuration. The finding supports a structure based primarily on the assembly of boehmite crystallites with Si—O—Al groups formed at the edges.

DTA analysis of the boehmite derived aerogels shows an exotherm centered near 405° C., and corresponds with a phase change from $\gamma$-AlOOH to $\gamma/\eta$-Al$_2$O$_3$, as confirmed by XRD. This phase transformation is accompanied by the loss of water corresponding with a nominally 15-16% mass loss. No DTA peaks were observed in the 500-1000° C. temperature range.

Figure 11:
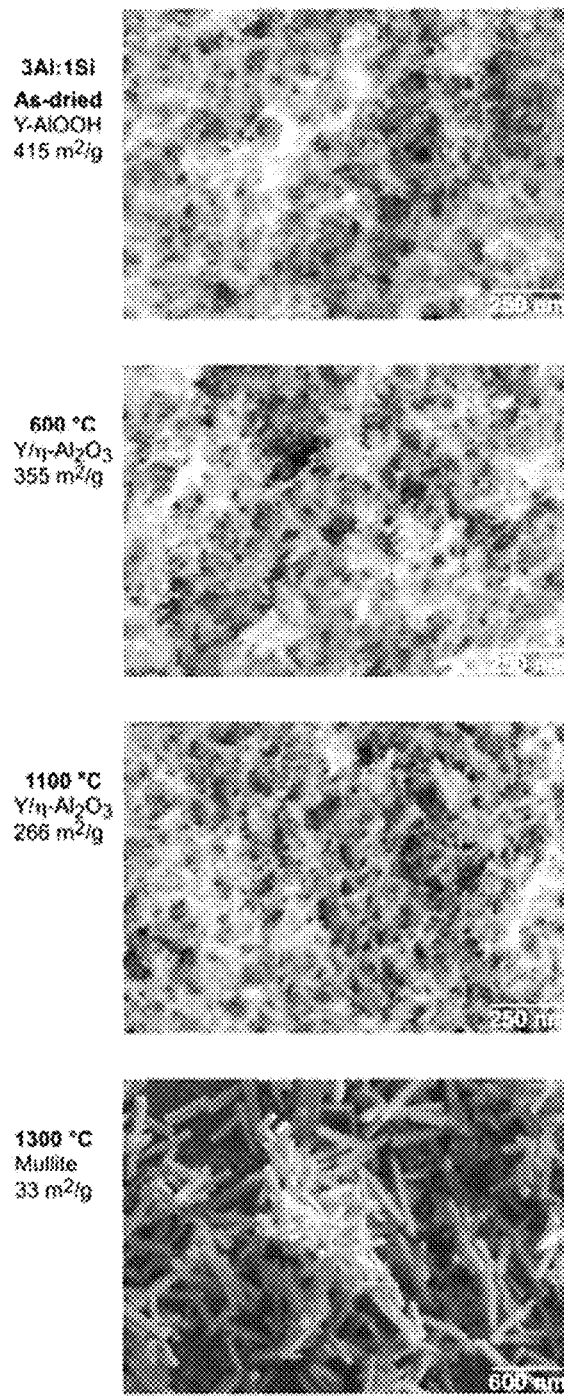
FIG. 11 illustrates phase changes and changes in morphology with heat treatment for a boehmite derived aerogel of the subject innovation.

FIG. 11 illustrates phase changes and changes in morphology with heat treatment for a boehmite derived 3Al:1Si aerogel synthesized using a P2W boehmite powder. In the aluminosilicates aerogel the $\gamma/\eta$-alumina phase established by 600° C. persists at 1100° C. and 1200° C. By 1300° C., the sample has densified to form mullite rods.

Figure 12:
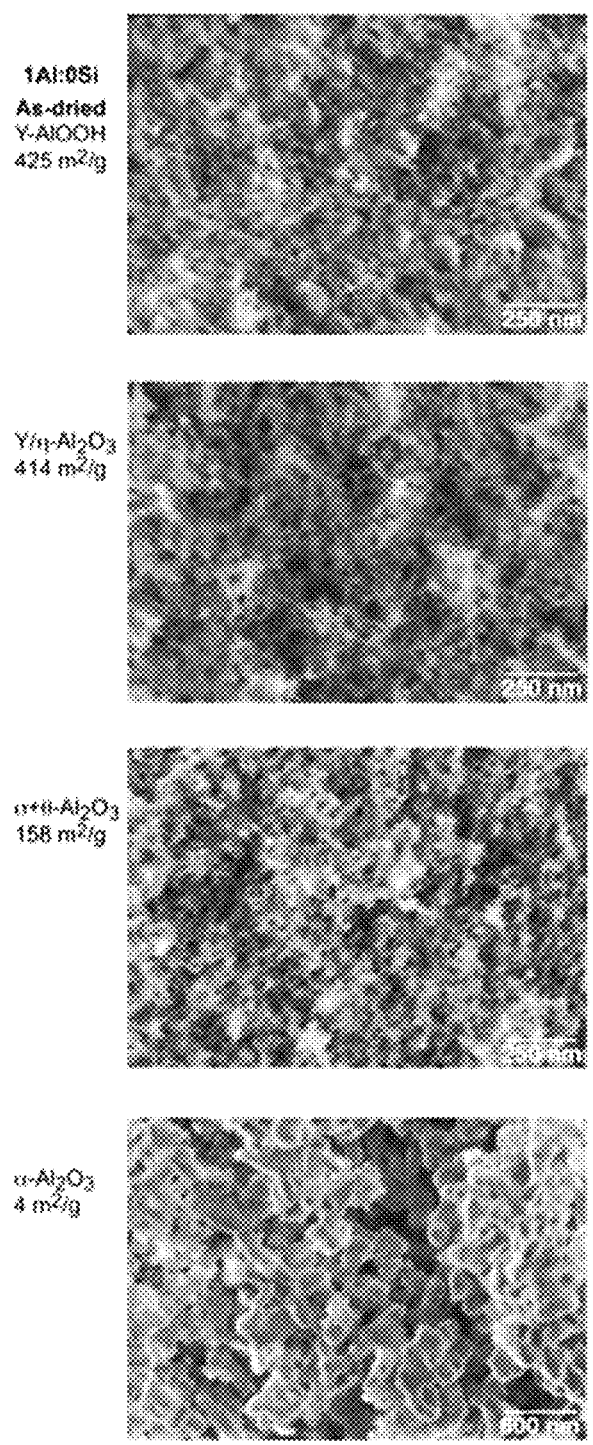
FIG. 12 illustrates phase changes and changes in morphology with heat treatment for all alumina aerogels of the subject innovation.

FIG. 12 illustrates phase changes and changes in morphology with heat treatment for a P2W all alumina (1Al:0Si) aerogel. In the case of the all alumina aerogel, the super-critically dried sample starts out with a surface area similar to that of the aluminosilicates (425 vs. 415 m$^2$/g). It transforms from $\gamma$-AlOOH to /$\eta$-alumina by 600° C., to $\delta+\theta$ alumina at 1100° C., and to $\alpha$-alumina by 1300° C. At 600° C. the surface are of the alumina aerogel is 414 m$^2$/g, while that of the aluminosilicates has decreased to 355 m$^2$/g. However, at 1100° C. the aluminosilicates aerogel still has a surface area of 266 m$^2$/g, while that of the alumina aerogel has decreased to 158 m$^2$/g. By 1300° C., both have densified.

Figure 13:
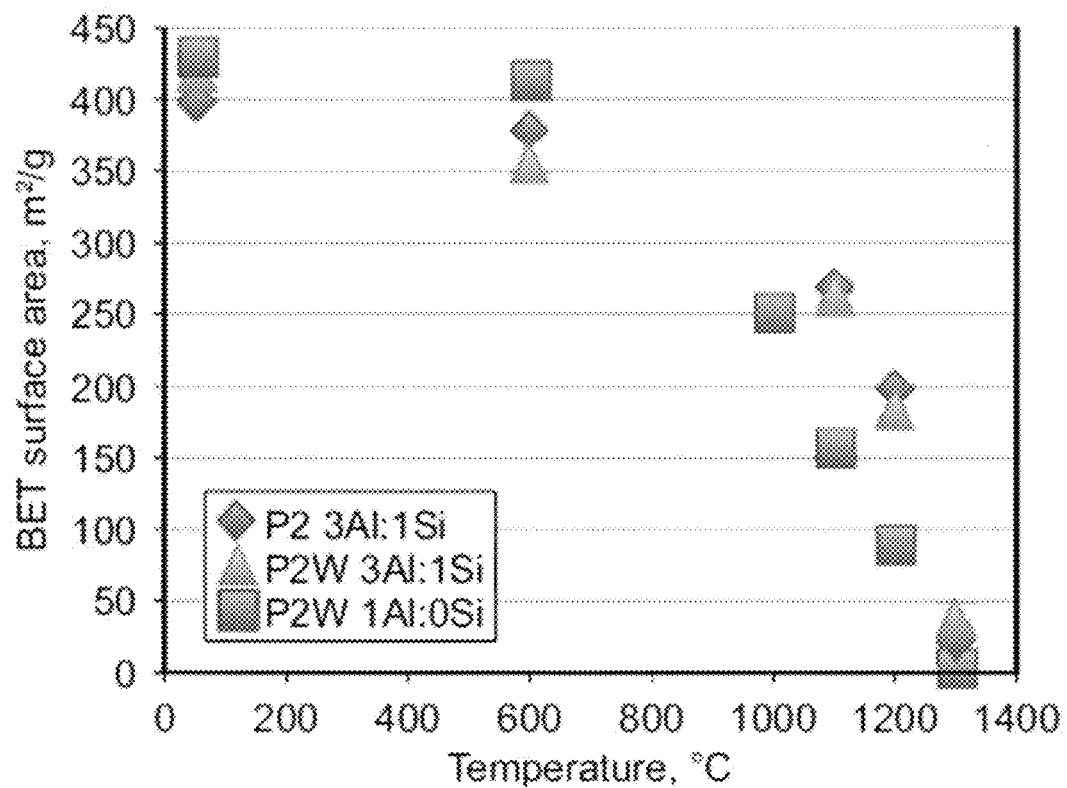
FIG. 13 illustrates a graph of aerogel surface area versus heat treatment temperature of boehmite derived aerogels of the subject innovation.

FIG. 13 illustrates the change in surface area with temperature for two different 3Al:1Si aluminosilicates aerogels, synthesized from P2 and P2W, and the all alumina P2W aerogel plotted as a function of temperature. There is no significant difference in the densification behavior of P2 versus P2W gels, which maintain a surface area of 266 m$^2$/g at 1100° C. FIG. 13 also demonstrates that the P2W boehmite all-alumina aerogels lose surface area about 100° C. earlier than the aluminosilicates. High surface area structures still were present after 60h at 700° C.

The two approaches to synthesizing aluminosilicates aerogels using the reaction of $AlCl_3$/TEOS/PO or boehmite/TEOS produced aerogels with very different surface areas, shrinkages, backbone structures and sintering behavior.

The boehmite synthesis pathway yielded lower physical density aerogels of nominally 0.06-0.07 g/cm³. The aerogels were stable on aging, offering larger processing windows for achieving consistent properties. Shrinkages were limited to less than 6%. The aerogels appeared to be the products of the self-assembly of boehmite crystallites, with their pore structure reflecting the particle size of the starting powders.

NMR and FTIR characterization suggested diphasic gels, with some Si—O—Al bonding, likely at the edges of Al—O—Al domains. Most significantly, they avoid crystallization to mullite in the temperature range from 980 to 1005° C. characteristic of monophasic gels. They also are characterized by surface areas of greater than 250 m²/g at 1100° C. Exposures at 700° C. for greater than 60 hours showed the mesoporous morphology was maintained. Because of this higher thermal stability, the boehmite approach appears to offer a tailorable pore structure suitable for very high temperature applications as catalyst supports or in thermal insulation. It also averts the use of potentially carcinogenic propylene oxide.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    providing a solution containing water and acid;
    dispersing as a suspension within the solution a boehmite alumina powder having a crystallite size range including and between 2.5 to 13.1 nanometers;
    adding a hydrolyzed silicon precursor to the solution to produce a colloidal alumina sol;
    infusing one or more reinforcements comprising ceramic paper, felt, or fabric with the colloidal alumina sol prior to gelation to produce a sol-infused reinforcement;
    allowing the colloidal alumina sol within the sol-infused reinforcement to gel, at an ambient or heated temperature, to form a gel composite having a gel backbone structure, wherein boehmite alumina of the sol-infused reinforcement self-assembles into the gel backbone structure;
    performing one or more solvent exchanges on the gel composite; and
    subjecting the gel composite to supercritical drying to create an aerogel composite.

2. The method of claim 1, further comprising heat treating the aerogel composite.

3. The method of claim 2, wherein during said heat treating the boehmite alumina is converted to a $\gamma$ and/or $\eta$-alumina aerogel.

4. The method of claim 1, comprising adding an opacifier to the sol after adding the hydrolyzed silicon precursor.

5. The method of claim 4, wherein the opacifier comprises at least one of titanium dioxide or zirconium dioxide.

6. The method of claim 1, comprising applying a compressive force to the sol infused reinforcement during gelation.

7. The method of claim 1, wherein the aerogel composite has a density of at most 0.15 gm/cm³.

8. The method of claim 1, wherein the aerogel composite has a thermal conductivity of less than 60 mW/m·K as measured at 900° C. based upon a three point measurement technique.

9. The method of claim 1, further comprising, prior to the infusing step, removing organic sizing or organic binders from the reinforcements.

10. The method of claim 1, wherein the hydrolyzed silicon precursor is tetraethyl orthosilicate (TEOS).

11. The method of claim 1, further comprising coating the reinforcement with an opacifier.

12. The method of claim 1, wherein the aerogel composite is then incorporated as one in a series of layered materials in a seal to suppress gas permeability.

* * * * *